Patented Dec. 31, 1940

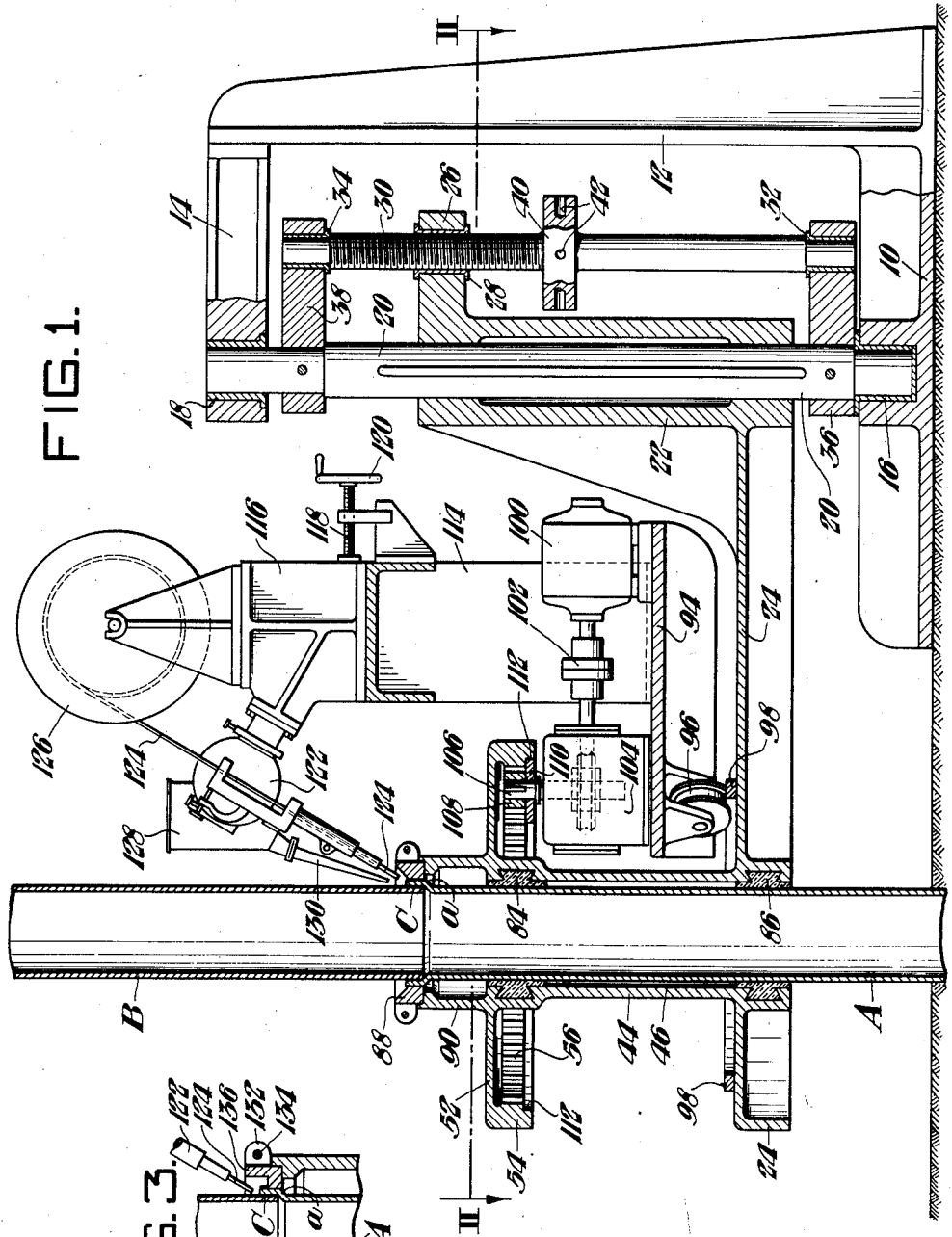

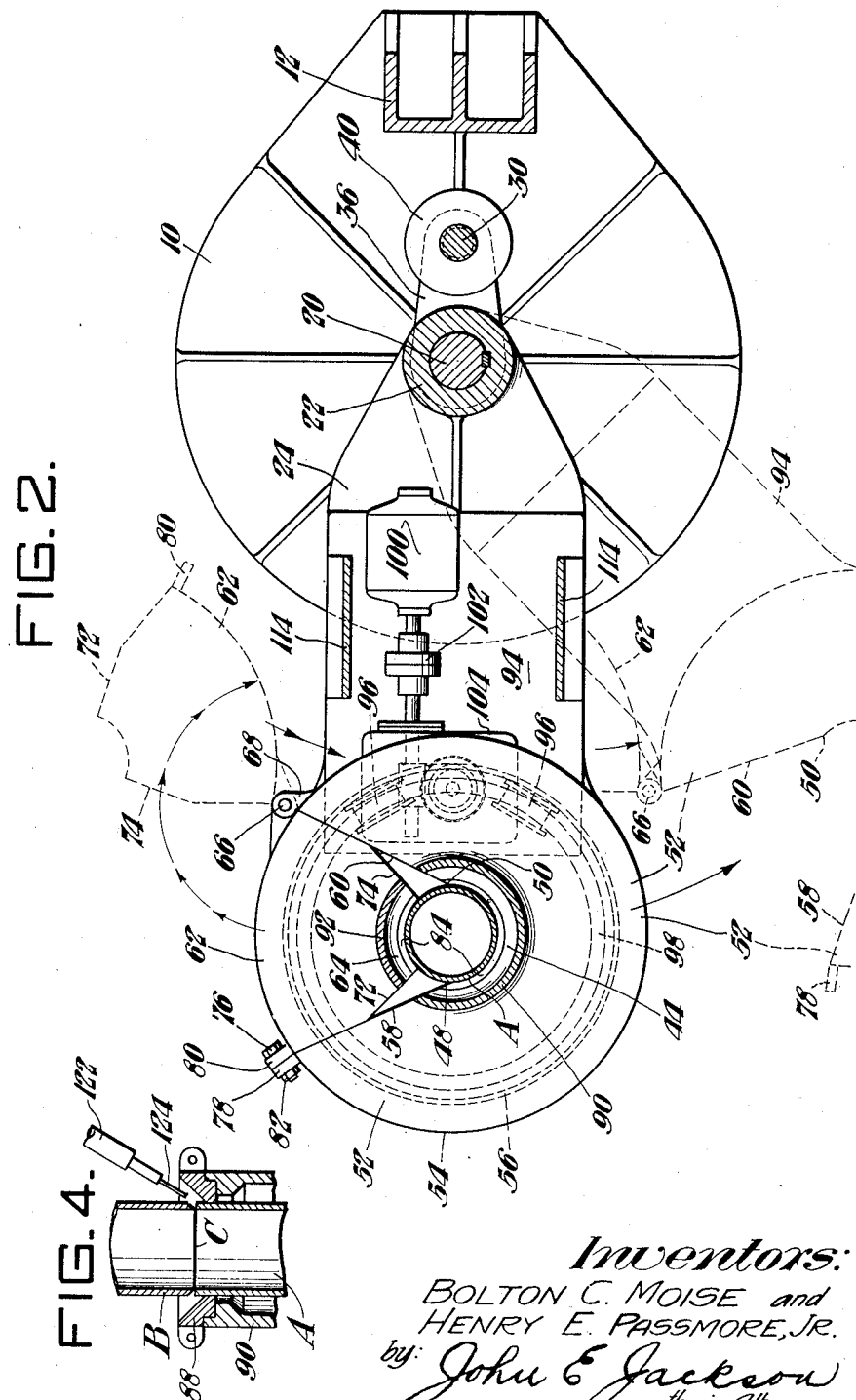

2,227,194

UNITED STATES PATENT OFFICE 2,227,194

APPARATUS FOR WELDING

Bolton C. Moise, Pittsburgh, and Henry E. Passmore, Jr., Mount Lebanon, Pa., assignors to National Tube Company, a corporation of New Jersey Application February 16, 1939, Serial No. 256,812

9 Claims. (Cl. 219—6)

The present invention relates to improvements in the means for effecting horizontal arc welds on upright surfaces. While not limited thereto, the particular apparatus disclosed is well suited for making welded joints between adjacent sections of cylindrical tubular articles such as oil well casings.

Heretofore horizontal arc welding on upright surfaces has generally been done by hand welding, with the result that the quality of the weld and the uniformity of application of weld metal is dependent on the skill of the operator. Even skilled operators do not distribute the weld metal with uniformity throughout the length of the weld, and lower quality welds generally are obtained due to the use of the short length of rods causing frequent interruptions.

One object of our invention is to overcome the above and other disadvantages inherent in the old manual welding practice, and to provide an improved apparatus for automatically welding continuous horizontal seams on vertical surfaces in such a manner that an extremely uniform or constant distribution of the weld metal is secured.

A further object is to provide means whereby the weld metal is applied at a constant rate, thus securing a uniform weld throughout the length of the welded joint.

A further object is to provide means involving the welding of articles in end-to-end relationship, which comprises the directing of a supply of flux toward the zone of engagement of the articles, feeding a welding wire towards said zone while retaining the flux at said zone, and maintaining a welding arc between said wire and the article as the wire is simultaneously moved at a substantially constant rate around the periphery of said zone, whereby the flux is melted and the weld metal applied is substantially uniform throughout the length of the joint thus made.

A further object of the invention is to provide a combination of interdependent instrumentalities capable of welding upright articles in end-to-end relationship in the manner to which reference is made immediately above.

The above and further features of the invention will be apparent from the following disclosure, the accompanying drawings and the appended claims.

In the drawings:

Figure 1 is a vertical longitudinal section through a welding machine of our invention;

Figure 2 is a horizontal section on line II—II of Figure 1; and

Figures 3 and 4 illustrate modifications relating to detail features of our invention.

According to our invention, upright articles, such as tubular cylindrical well casing members A and B, are adapted to be united by a welded joint in the zone C where they engage one another in end-to-end relationship. As illustrated, the casing A is formed with an enlarged socket portion a to telescopically receive the end of the casing B. It is to be understood, however, that the parts could be butt joined, if desired, as indicated in Figure 4.

In operation, the parts to be united are arranged in end-to-end relationship, as illustrated in Figures 1, 3 and 4, and an arc is struck, the welding wire being pointed at the intersection or zone where the two upright articles engage one another in end-to-end relationship.

A powdered, granular or other suitable flux is supplied in advance of the welding wire while the welding wire is caused to move, at a uniform rate, peripherally around the work. At the same time, the welding wire is fed forward to supply the requisite amount of weld metal. During this operation, provision is made for retaining the flux which, of course, becomes molten as the operation proceeds. The weld metal is thus protected during and after deposition. Because of the coordinate relationship of the forward feed of the welding wire and the lateral traverse at a constant rate around the zone of the joint, an extremely uniform weld is secured and the amount of weld metal applied at all points of the welded joint is uniform. Thus an excellent welded joint is effected.

Referring in detail to the drawings, the apparatus includes a base 10 having an upright pedestal 12 carrying at its upper end a laterally extending arm 14. Bearings 16 and 18, carried respectively in the base 10 and the arm 14, rotatably support an upright pintle post 20 to which is splined the hub 22 of a swingable carriage support 24. Extending rearwardly from the hub 22 there is an arm 26 carrying a nut 28 for engagement with a vertical feed screw 30 loosely journaled at 32 and 34 in lateral arms 36 and 38 secured to the pintle post 20. The said screw 30 has secured thereto a collar 40 provided with suitable cavities 42 for the engagement with a spanner wrench or other tool for manipulation of the collar. The turning of the said screw 30, it will be understood, serves to vertically adjust the carriage support 24.

Near its outer end the carriage support is provided with an integral upwardly extending sleeve-like portion 44, the inner wall of which defines a part of a clamp chamber 46 for receiving one of the cylindrical work-pieces A to be welded.

As viewed in plan, the shell-like wall 44 is approximately semi-circular, terminating at points 48 and 50.

Formed integrally with the shell-like portion 44 at the top thereof is a horizontal web portion 52 and an annular rim portion 54, on the interior of which internal gear teeth 56 are formed.

The web 52 is cut away along the diagonal lines 58 and 60, and a swingable segment 62 is provided which has a shell-like portion 64 to complement the shell-like portion 44. The segment 62 is hinged at 66 to a lug 68 extended from the rim 54. This segment is cut away, as indicated at 72 and 74, in such a way that it can be swung about its hinge 66 to the dotted portion of Figure 2 to permit ready engagement and disengagement with the cylindrical pieces to be welded. Thus the pieces can be easily clamped or unclamped at the start and finish of the welding operation. A suitable segment lock is provided which, in the case illustrated, merely comprises a bolt 76 which passes through lugs 78 and 80 and is fastened by a nut 82.

The sleeve portions 44 and 64, respectively, carry, near their upper and lower ends, rubber insulator clamp bushings 84 and 86, these bushings having portions of dovetail cross sectional form to fit in dovetail seats, as shown.

Flux retaining means, indicated generally at 88, are provided and these means are supported by upward, sleeve-like extensions 90 and 92 formed on the web 52 and segment 62, respectively, so that, when the segment is swung away to open position, a portion of the flux retainer is similarly moved.

The flux retainer 88 is positioned in the zone where the cylindrical tubular parts A and B to be united make end-to-end engagement with one another. This flux retainer is adapted to receive the flux, which is fed thereto at a point in advance of a wire electrode.

Means to be presently described are provided for moving the wire electrode in a substantially circular orbit around the work at a constant rate so as to thus apply an extremely uniform layer of weld metal.

For supporting the welding mechanism and flux magazine, we provide a carriage, indicated generally at 94, provided with flanged wheels 96 riding on a circular track 98 secured to the base of the carriage support 24. The driving shaft of a motor 100 is connected by a coupling 102 with a worm gear reduction unit 104, which includes a vertical shaft 106 carrying a planetary gear 108 meshing with the internal gear teeth 56 formed in the rim 54. A roller 110 on the shaft 106 rides on an annular race 112 also formed in the rim 54.

As thus arranged, it will be apparent that, when the motor is energized, the carriage 94 and all parts carried thereby will travel in a circular orbit about the vertical axis of the cylindrical articles A and B to be united.

A standard 114 mounted on the carriage 94 slidably supports at its upper end a welding unit, indicated as a whole at 116. A suitable adjusting screw 118 is provided with a hand wheel 120 by means of which the welding unit 116 can be fed laterally toward or from the work. The welding unit includes a conventional type of automatic electric welding head 122 of conventional form which need not be described in detail, except to say that it is arranged to withdraw welding wire 124 from a reel 126 and to feed the same diagonally downward toward the zone where the parts to be united engage one another.

A magazine 128 for powdered welding flux is mounted adjacent the welding head and is movable therewith. A pipe 130 is provided to convey or direct the flux toward the flux retainer 88, the parts being so arranged that, as the welding wire travels in its circular orbit around the zone of the joint, the flux is applied in advance of the welding wire. In this way the arc struck between the welding wire and the work serves to melt the flux and to deposit the weld metal through the flux. The flux flows by gravity through the pipe and its rate of flow is controlled by a suitable slide valve.

The feed of the welding wire toward the work can be so adjusted as to bear a predetermined relationship to the rate of travel of the welding unit in its circular orbit. Thus it is apparent that an extremely accurate and uniform distribution of weld metal will be secured.

While generally the flux retaining means will be so arranged that portions thereof are brought into operative engagement upon swinging of the segment 62 to and from operative positions, in some cases we may use an alternative type of flux trough and chill ring, such as shown in Figure 3, which will merely be in the form of a split ring 132, the halves of which are adapted to be secured by suitable bolts 134 so as to clamp trough-like half sections 136 in operative relationship to one of the parts to be joined adjacent the zone of engagement of said parts.

From the foregoing detailed description, it should be readily apparent that, in order to weld upright cylindrical pieces to one another, the carriage support 24 can be swung about the pintle post 20 so as to bring the socket portion 46 into engagement with the article. The segmental portion 62 is then swung to closed or clamping position from the dotted line to the full line closed position of Figure 2 and the locking means 76 and 82 engage. Before swinging the segment 62 to closed position, if required, vertical adjustment of the mechanism can be effected by manipulation of the adjusting screw 30, as will be understood.

After the parts have been brought to the operative relationship shown in full lines in Figures 1 and 2, they are in readiness for turning on the welding current and starting the motor.

The term "comminuted flux" as used herein is intended to apply to flux in either a granulated or powdered state, and it is also intended to be interpreted broadly enough to cover a flux which may be carried in a somewhat viscous binder and extruded in a plastic state.

While we have described a specific construction of machine, it is to be understood that the drawings and descriptive matter are to be interpreted in an illustrative rather than a limiting sense, since various modifications may be made by those skilled in the art without departure from the invention, as defined in the appended claims.

We claim:

1. A machine for welding pipes in end-to-end relationship comprising positioning means for supporting said pipes in an upright end to end position, separable flux retaining means engageable with the pipes in the zone where they engage one another, an electric welding unit carrying a supply of welding wire and a supply of flux, supporting means for said unit, and means including a motor and gearing coacting with said positioning means for moving the unit at a substantially constant predetermined rate around the pipes whereby the flux and weld metal are applied uniformly about the joint.

2. A machine for welding pipes in end-to-end relationship comprising positioning means for supporting them in an axially aligned upright position, separable flux retaining means engageable with the pipes in the zone where they engage one another, an electric welding unit carrying a supply of welding wire and a supply of flux, means for conveying said flux to said retaining means at a point in advance of the welding wire, supporting means for said unit, and power means for rotating the latter about the longitudinal axis of said articles, said power means including a motor and gearing coacting with said positioning means.

3. A machine for welding cylindrical articles in end-to-end relationship comprising means for supporting said articles in vertical alignment, including a clamp member movable to and from article embracing position, flux retaining means supported by said clamp and surrounding the articles in the zone where they engage one another, a welding unit carrying a supply of welding wire and flux, respective means for conveying the flux and feeding wire toward said zone of engagement and means for automatically moving said welding unit in a substantially circular orbit about the longitudinal axis of said articles at a rate coordinated with the feed of the welding wire.

4. A machine for welding cylindrical articles in end-to-end vertical relationship comprising a standard rotatably supporting an upright pintle post, a carriage support vertically adjustable along said post, clamping means coacting with a portion of the support for holding one of said articles, a carriage on said support, means for guiding and propelling said carriage around the axis of said articles; and a welding unit supported by said carriage and having means for feeding a welding wire toward the zone where the said articles engage one another.

5. A machine for welding cylindrical articles in end-to-end upright relationship comprising a standard rotatably supporting an upright pintle post, a carriage support adjustably mounted thereon, clamping means coacting with a portion of the support for embracing one of said articles, a carriage on said support movable around the axis of said articles, a welding unit supported by said carriage and having means for feeding a welding wire toward the zone where the said articles engage one another, flux retaining means surrounding said zone, a magazine for flux movable with the carriage around said axis, and means for delivering flux to said retaining means in juxtaposition to said welding wire as the latter is fed toward said zone.

6. A welding machine for welding upright cylindrical articles in end-to-end relationship comprising a support having an article receiving chamber, a member movable in relation thereto and coacting with the support for clamping an article in said chamber, a flux retainer having one part secured to said support and the other secured to said member, a carriage having a welding unit mounted thereon, and means propelling said carriage and welding unit around the axis of said article receiving chamber.

7. A welding machine for welding cylindrical articles in end-to-end relationship comprising a support having an article receiving chamber, a member movable in relation thereto and coacting with the support for clamping an article in said chamber, a flux retainer having one part secured to said support and the other secured to said member, a carriage having a welding unit mounted thereon, and a motor and planetary gearing for propelling said carriage and welding unit around the axis of said article receiving chamber.

8. The welding machine of claim 6 wherein said support is mounted on an upright post rotatable about a vertical axis laterally spaced from the axis of said chamber.

9. The welding machine of claim 6 wherein said support is mounted on an upright post rotatable about a vertical axis laterally spaced from the axis of said chamber and including means for vertically adjusting said support along said upright.

BOLTON C. MOISE.
HENRY E. PASSMORE, Jr.